United States Patent
Motla et al.

(10) Patent No.: US 10,467,077 B2
(45) Date of Patent: Nov. 5, 2019

(54) CONFIGURATION ITEM INTEGRITY

(71) Applicant: Hewlett Packard Enterprise Development LP, Houston, TX (US)

(72) Inventors: Bhushan K. Motla, Alpharetta, GA (US); Holly Nguyen, Houston, TX (US); Mudasser A. Zaheer, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 190 days.

(21) Appl. No.: 15/540,139

(22) PCT Filed: Jan. 27, 2015

(86) PCT No.: PCT/US2015/013079
§ 371 (c)(1),
(2) Date: Jun. 27, 2017

(87) PCT Pub. No.: WO2016/122460
PCT Pub. Date: Aug. 4, 2016

(65) Prior Publication Data
US 2018/0018212 A1    Jan. 18, 2018

(51) Int. Cl.
*G06F 11/00* (2006.01)
*G06F 11/07* (2006.01)
(Continued)

(52) U.S. Cl.
CPC ........ *G06F 11/0766* (2013.01); *G06F 11/004* (2013.01); *G06F 16/119* (2019.01); *H04L 1/0073* (2013.01)

(58) Field of Classification Search
CPC ............... G06F 11/0766; G06F 11/004; G06F 11/0709; G06F 11/0727; G06F 11/079;
(Continued)

(56) References Cited

U.S. PATENT DOCUMENTS

| 8,429,630 | B2 | 4/2013 | Nickolov et al. |
| 8,458,451 | B2 | 6/2013 | Shasha et al. |

(Continued)

FOREIGN PATENT DOCUMENTS

| CN | 100350391 | 10/2005 |
| CN | 103067502 | 4/2013 |

OTHER PUBLICATIONS

"Compucom Named an Industry Challenger for Data Center Outsourcing arid Infrastructure Utility Services, North America"; Aug. 11, 2014; 1 Pg., http://www.compucom.com/taxonomy/term/107.

(Continued)

*Primary Examiner* — Joseph D Manoskey
(74) *Attorney, Agent, or Firm* — Hewlett Packard Enterprise Patent Department

(57) ABSTRACT

Example implementations relate to configuration item integrity. For example, a computing device may include a processor. The processor may receive a request for feedback specifying data integrity associated with a configuration item migrated from a first system to a second system. The configuration item is associated with a data source. The data integrity indicates quality and completeness of the configuration item. The processor may identify anomalies associated with the configuration item and unresolved conflicts between the configuration item and at least one other data source. The processor may generate a high availability and disaster recovery forecast associated with the configuration item and may calculate the data integrity based on the anomalies, the unresolved conflicts, and the high availability and disaster recovery forecast. The processor may provide the feedback specifying the data integrity.

20 Claims, 4 Drawing Sheets

(51) Int. Cl.
*G06F 16/11* (2019.01)
*H04L 1/00* (2006.01)

(58) Field of Classification Search
CPC ............ G06F 11/0793; G06F 11/1402; G06F 11/1448; G06F 11/1458; G06F 11/2069; G06F 11/2082; G06F 16/119; H04H 1/0073
See application file for complete search history.

(56) References Cited

U.S. PATENT DOCUMENTS

| | | | |
|---|---|---|---|
| 2009/0006493 A1* | 1/2009 | Draper | G06F 8/71 |
| 2009/0240717 A1 | 9/2009 | Mimatsu | |
| 2010/0070478 A1* | 3/2010 | Anglin | G06F 11/1453 707/674 |
| 2012/0330911 A1 | 12/2012 | Gruenheid et al. | |
| 2015/0019195 A1 | 1/2015 | Davis | |
| 2015/0019488 A1* | 1/2015 | Higginson | G06F 16/214 707/634 |
| 2015/0026127 A1* | 1/2015 | Zachrisen | G06Q 10/00 707/634 |

OTHER PUBLICATIONS

International Searching Authority, The International Search Report and the Written Opinion, dated Oct. 26, 2015, PCT/US2015/013079, 11 Pgs.

Rout, S.; "Global Infrastructure Services"; May 29, 2012; 64 Pgs., http://www.wipro.com/Documents/Global_Infrastructure_Services_Review_2012.pd.

* cited by examiner

| Input | Data Tab ID | Anomalies | Consistent | Integrity | Notes |
|---|---|---|---|---|---|
| Application Portfolio | Data – DCS App | Orange | Red | Red | 1. Anomalies: 38 (15%) ApplicationID from Application Portfolio not in Instance Mapping: App-to-OS; with 38 Applications with AppManager not provided<br>2. Consistency: 7 (3%) Application ID from Instance Mapping: App-to-OS not in Application Portfolio<br>3. Integrity: 5 (2%) Complexity not provided<br>4. Integrity: 53 (21%) UserCount not provided |
| App-to-App Dependency | Data – DCS A2A | Orange | Green | Green | |
| Database Inventory | Data – DCS Database | Red | Red | Green | 1. Anomalies: 35 (30%) InstanceName from Database Inventory not in Instance Mapping: App-to-OS<br>2. Consistency: 3 (0%) Database Solution from Instance Mapping: App-to-OS not in Database Inventory |

*FIG. 4*

CONFIGURATION ITEM INTEGRITY

BACKGROUND

A data center may house computer systems and associated components, such as telecommunications systems, servers, and storage systems. A data center may also include redundant or backup components, such as power supplies, data communications connections, environmental controls, security devices, and the like. A data center may operate systems associated with a particular company. For example, a company may hire a third-party service provider to manage the company's systems through the third-party service provider's data center.

BRIEF DESCRIPTION OF THE DRAWINGS

Some examples of the present application are described with respect to the following figures:

FIG. 4 is a table of example feedback specifying data integrity.

DETAILED DESCRIPTION

Figure 1:
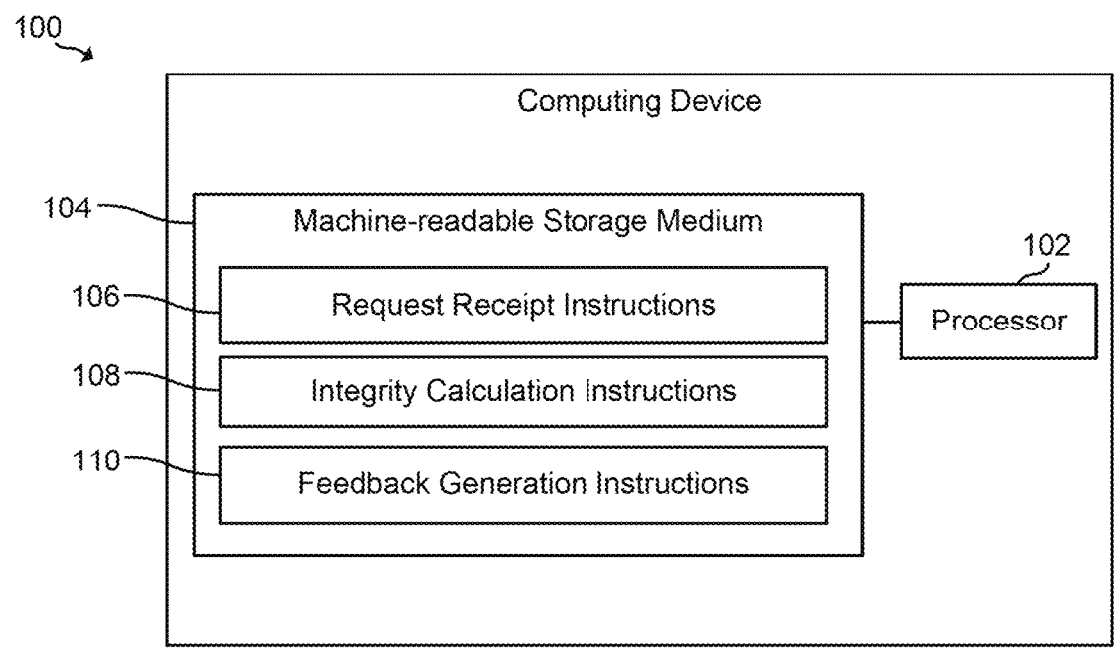
FIG. 1 is a block diagram of an example computing device for generating feedback specifying the data integrity of a configuration item.

As described above, a data center may operate systems associated with a particular company. For example, a company may migrate their data to a third party data center service provider system such that the service provider may manage and operate the company's systems on the company's behalf. Often times when data is migrated from one system to another, certain data components may be inconsistent and/or incomplete for various reasons, and this issue may not be detected until the initial attempt to operate the newly migrated system, which may cause operational delays.

An assessment tool may be used to analyze the status of data migrated from one system to another in order to determine whether the migrated data is operational and/or functional on the system to which the data was migrated, thereby mitigating and/or avoiding any operational delays that may be associated with inconsistent and/or incomplete data. The assessment tool may be an application run on one or more computing devices that may manage and control the migration of data onto a particular system and may allow a user (e.g., a service provider operator) to view the status of the data migration. For example, the user may submit a request for feedback associated with the migrated data, and the assessment tool may return feedback in response to the request. The feedback may be requested for one or more configuration items within the migrated data. A configuration item may refer to any unit of an information technology (IT) infrastructure, such as documents, software, models, plans, and the like. When feedback associated with one or more configuration items is requested, feedback specifying data integrity associated with the one or more configuration items may be calculated and provided to the requesting user.

Data integrity of a configuration item may refer to the quality and/or completeness of the configuration item data that has been migrated.

In some examples, one or more computing devices running the assessment tool application may receive the request for feedback, where the feedback may specify data integrity associated with a configuration item migrated from one system to another system. The configuration item may be associated with a data source. The assessment tool may identify any anomalies associated with the configuration item and may identify any unresolved conflicts between the configuration item and at least one other data source. The assessment tool may generate a high availability and disaster recovery forecast associated with the configuration item. The data integrity may be calculated by the assessment tool based on the anomalies, the unresolved conflicts, and the high availability and disaster recovery forecast. Once the data integrity is calculated, feedback specifying the data integrity may be provided via the assessment tool.

In addition to providing feedback specifying data integrity of migrated data, the assessment tool may provide collaboration between various users executing a data migration project. The assessment tool may support development, scheduling, and tracking of project plans. The assessment tool may include integrated import and export capabilities that utilize structured query language (SQL) server integration services (SSIS), including extract, transform, load (ETL) services. The assessment tool may interface to other discovery tools and configuration management tools and may include integrated SQL server reporting services (SSRS)-based reporting capabilities.

Data to be migrated to a data center may be received at the data center from the data provider (e.g., a company requesting that the data center operate its systems). The data received at the data center may include configurations items that are part of the data provider's IT environment, such as servers, applications, middleware, network, storage, databases, and the like. In some examples, the configuration items may be interdependent (e.g., applications may run on servers and may interface to other applications). The data received at the data center may also include attributes associated with each configuration item. For example, a server configuration item may be associated with central processing unit (CPU) cores, memory, a hostname, asset tags, and the like.

Once the data center receives the data, the data center may determine whether the data provider is a trusted data provider. If the data provider is not a trusted data provider, a two-dimensional (2-D) data model of each configuration item received may be created and used by the data center. If the data provider is a trusted data provider, the data model provided by the data provider may be used by the data center. These data models may be implemented relationally in a normalized form in a SQL server managed by the data center and may map various configuration items to each other.

The data center's integrated SQL SSIS ETL services may be used to extract, transform, and load configuration item data from the data provider database to the data center's internal data repository. For each configuration item extracted, transformed, and loaded to the data center's internal data repository, the data center determines whether the configuration item is already associated with an existing data source in the data center's internal data repository. If not, a new source compartment is dynamically created for the configuration item. As such, each configuration item may be associated with a corresponding data source in the data center's internal data repository, and the loaded data may be imported to the internal data repository of the data center.

Once the data is imported to the internal data repository, the assessment tool may be used to determine the data integrity of the migrated data, such as the quality and/or completeness of the migrated data. The quality of a configuration item may refer to how current and/or consistent the configuration item data is with respect to other data from the data provider. The completeness of a configuration item may refer to how complete the configuration item data is (e.g., whether any configuration item components may be missing). The data integrity may be determined by analyzing the data and the associated data models with respect to various rules and protocols associated with the data, such as cross-reference rules, data type rules, range and constraint rules, code rules, lightweight directory access protocol (LDAP), portfolio of offerings, enterprise service solution compatibility matrix, plug-ins, and the like. These rules and protocols may be used to perform data consistency and referential integrity checks on the data being analyzed. In some examples, conflict mitigation rules between data sources may be used to perform integrity checks and to determine any unresolved conflicts within the data. In some examples, any anomalies within the data may be detected by using a process operations database and applying business rules based on conditional constraints to the data being analyzed. In some examples, a high availability and disaster recovery (HA/DR) forecast may be generated and used to forecast HA/DR, which may be used to analyze the operational readiness of the data. Once the appropriate analysis is performed, feedback specifying the data integrity of the analyzed data may be generated and provided using the analysis results, such as the anomalies and unresolved conflicts detected and the HA/DR forecast generated. In some examples, if any gaps in data are found in the analysis, the gaps may be identified in the feedback. In some examples, the gaps may be automatically filled in with the appropriate data. In some examples, a form (e.g., a questionnaire) requesting additional information associated with the gaps may be automatically generated and provided through the assessment tool, and a user operating the assessment tool may use the form to provide the additional information that may be used to fill in the gaps with the appropriate data.

The feedback may be used to determine whether the data integrity of the migrated data is sufficient such that the data is operational through the data center. If the feedback indicates that the data may not be complete and/or may not be of sufficient quality, data center operators may continue to migrate data from the data provider until the data center data appears sufficient for operation. Once the feedback indicates that the data center data may be operational, the data center may begin operating the data provider's systems on their behalf.

Referring now to the figures, FIG. 1 is a block diagram of an example computing device 100 for generating feedback specifying the data integrity of a configuration item. As used herein, a configuration item may refer to any unit of an IT infrastructure, such as documents, software, models, plans, and the like. Additionally, as used herein, the data integrity of a configuration item may refer to the quality and/or completeness of the configuration item data that has been migrated from a first system to a second system.

Computing device 100 may be, for example, a web-based server, a local area network server, a cloud-based server, a notebook computer, a desktop computer, an all-in-one system, a tablet computing device, a mobile phone, an electronic book reader, a printing device, or any other electronic device suitable for generating feedback specifying the data integrity of a configuration item. Computing device 100 may include a processor 102 and a machine-readable storage medium 104. Computing device 100 may generate feedback specifying data integrity of a configuration item in response to a request for the feedback.

Processor 102 is a tangible hardware component that may be a central processing unit (CPU), a semiconductor-based microprocessor, and/or other hardware devices suitable for retrieval and execution of instructions stored in machine-readable storage medium 104. Processor 102 may fetch, decode, and execute instructions 106, 108, and 110 to control a process of generating feedback specifying the data integrity of a configuration item. As an alternative or in addition to retrieving and executing instructions, processor 102 may include at least one electronic circuit that includes electronic components for performing the functionality of instructions 106, 108, 110, or a combination thereof.

Machine-readable storage medium 104 may be any electronic, magnetic, optical, or other physical storage device that contains or stores executable instructions. Thus, machine-readable storage medium 104 may be, for example, Random Access Memory (RAM), an Electrically Erasable Programmable Read-Only Memory (EEPROM), a storage device, an optical disc, and the like. In some examples, machine-readable storage medium 104 may be a non-transitory storage medium, where the term "non-transitory" does not encompass transitory propagating signals. As described in detail below, machine-readable storage medium 104 may be encoded with a series of processor executable instructions 106, 108, and 110 for receiving a request for feedback specifying data integrity associated with a configuration item migrated from a first system to a second system, where the configuration item is associated with a data source and the data integrity indicates the quality and completeness of the configuration item; identifying anomalies associated with the configuration item and unresolved conflicts between the configuration item and at least one other data source; generating a high availability and disaster recovery forecast associated with the configuration item; calculating the data integrity based on the anomalies, the unresolved conflicts, and the high availability and disaster recovery forecast; and providing the feedback specifying the data integrity.

Request receipt instructions 106 may manage and control the receipt of requests for feedback. Requests for feedback may be received from a user using the assessment tool. The feedback may specify data integrity associated with a configuration item migrated from a first system to a second system. For example, the configuration item may be a configuration item migrated from a customer system to a service provider system. The configuration item may be associated with a particular data source. The data integrity may indicate a quality and completeness of the configuration item.

Integrity calculation instructions 108 may manage and control the determination and calculation of data integrity associated with a configuration item. In some examples, integrity calculation instructions 108 may identify anomalies associated with the configuration item and unresolved conflicts between the configuration item and at least one other data source. In some examples, integrity calculation instructions 108 may also generate a high availability and disaster recovery forecast associated with the configuration item. In some examples, integrity calculation instructions 108 may calculate the data integrity based on the anomalies, the unresolved conflicts, and/or the high availability and disaster recovery forecast.

Feedback generation instructions 110 may manage and control the generation of feedback specifying the data integrity. For example, feedback generation instructions 110 may use the data integrity calculated by integrity calculation instructions 108 to generate the feedback specifying the data integrity and may provide the feedback to the requesting user via the assessment tool.

Figure 2:
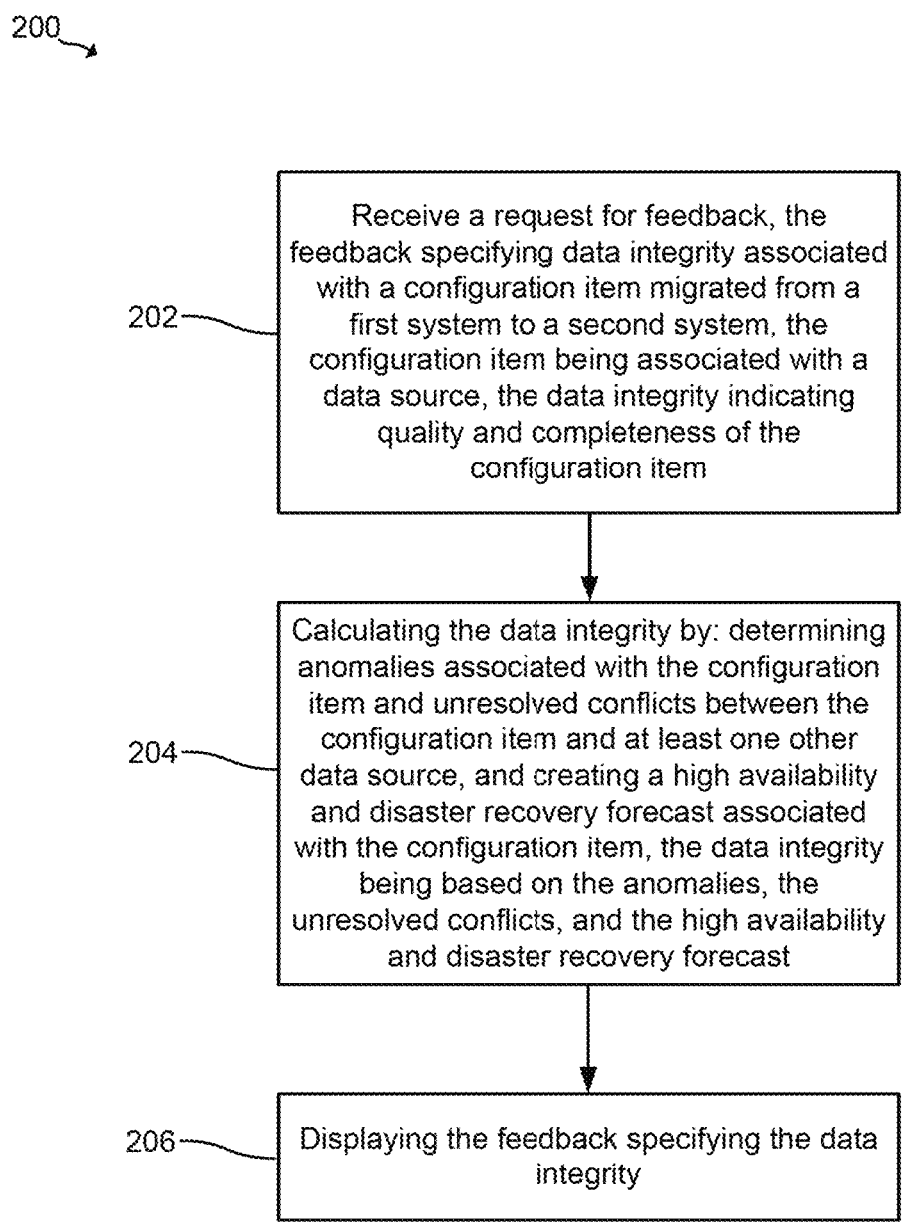
FIG. 2 is a flowchart illustrating an example method of displaying feedback specifying the data integrity of a configuration item.

FIG. 2 is a flowchart illustrating an example method 200 of displaying feedback specifying the data integrity of a configuration item. Method 200 may be implemented using computing device 100 of FIG. 1.

Method 200 includes, at 202, receiving a request for feedback specifying data integrity associated with a configuration item migrated from a first system to a second system. The configuration item may be associated with a data source. The data integrity may indicate quality and/or completeness of the configuration item.

Method 200 also includes, at 204, calculating the data integrity. The data integrity may be calculated by determining anomalies associated with the configuration item and unresolved conflicts between the configuration item and at least one other data source and by creating a high availability and disaster recovery forecast associated with the configuration item. The data integrity may be based on the anomalies, the unresolved conflicts, and the high availability and disaster recovery forecast.

Method 200 also includes, at 206, displaying the feedback specifying the data integrity. For example, the feedback may be displayed to a user via the assessment tool.

Figure 3:
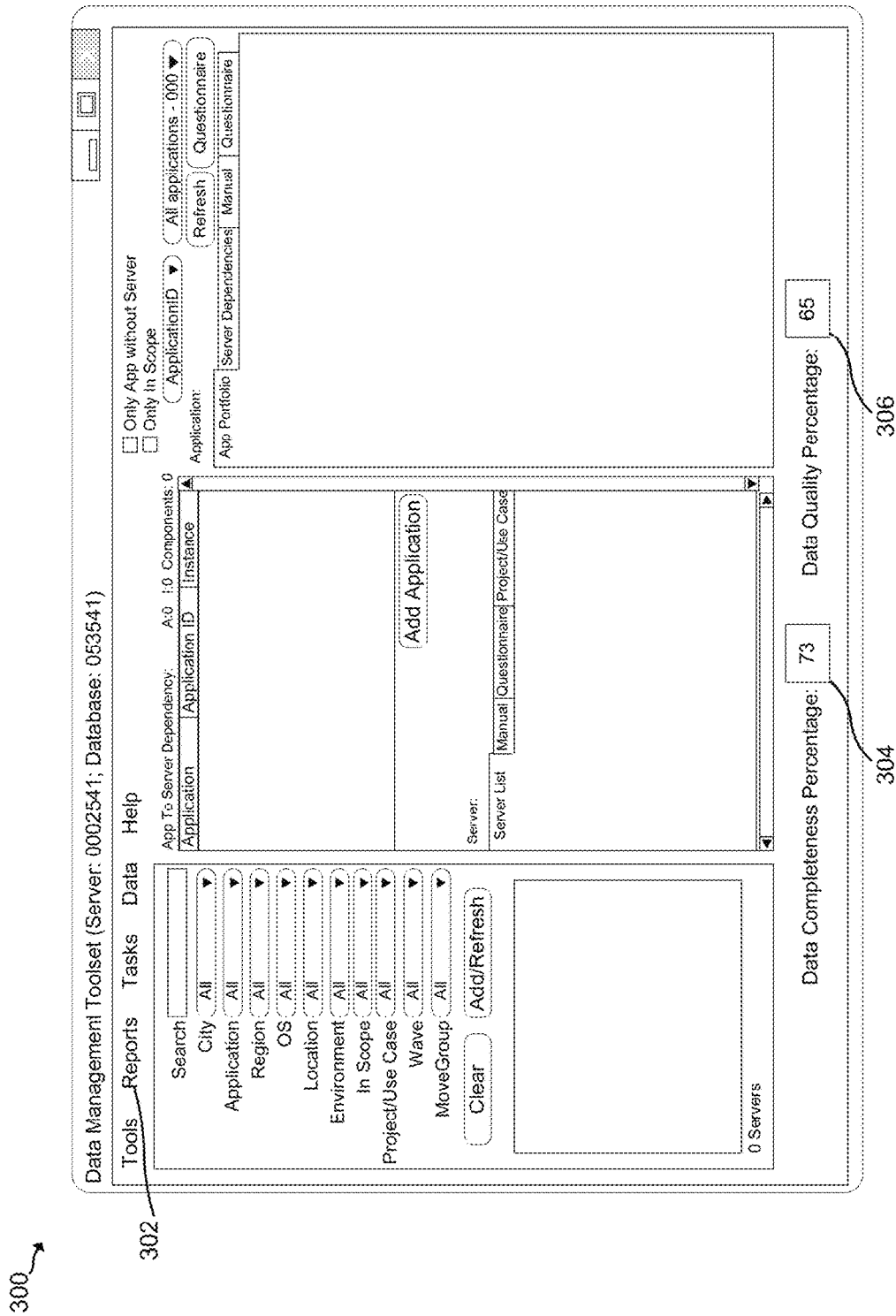
FIG. 3 is an interface diagram illustrating an example user interface for requesting and accessing feedback specifying the data integrity of a configuration item.

FIG. 3 is an interface diagram illustrating an example user interface 300 for requesting and accessing feedback specifying the data integrity of a configuration item. User interface 300 may be an assessment tool that may be used to view and manage data migrated from a first system to a second system. For example, user interface 300 may be used to calculate and view the status of configuration items migrated to a service provider system.

User interface 300 may provide feedback associated with the data integrity of one or more configuration items that have been migrated. For example, user interface 300 may provide feedback 304 indicating a percentage associated with data completeness and feedback 306 indicating a percentage associated with data quality of one or more configuration items that have been migrated.

User interface 300 may include a reports tab 302 that a user may click on to run and view various reports associated with migrated data. For example, the reports tab 302 may be used to select various reports to run and view, such as reports relating to data quality assessment, data quality by application, summary findings, data completeness, data readiness, and the like.

FIG. 4 is a table 400 of example feedback specifying data integrity. For each input, table 400 may show the associated data tab identifier as well as feedback indicating anomalies, data consistency, data integrity, and any notes associated with the input. In the example of table 400, the anomalies, consistency, and data integrity feedback may be shown as a particular color indicating a status associated with the respective feedback. For example, the integrity feedback may display green if the data integrity is relatively good, orange if the data integrity is fair, and red if the data integrity is poor. The notes of table 400 may show additional and/or more specific information relating to the anomalies, consistency, and integrity feedback, such as percentages relating to the feedback, information about the reasons for a particular feedback score, and the like.

Examples provided herein (e.g., methods) may be implemented in hardware, software, or a combination of both. Example systems may include a controller/processor and memory resources for executing instructions stored in a tangible non-transitory medium (e.g., volatile memory, non-volatile memory, and/or machine-readable media). Non-transitory machine-readable media can be tangible and have machine-readable instructions stored thereon that are executable by a processor to implement examples according to the present disclosure.

An example system can include and/or receive a tangible non-transitory machine-readable medium storing a set of machine-readable instructions (e.g., software). As used herein, the controller/processor can include one or a plurality of processors such as in a parallel processing system. The memory can include memory addressable by the processor for execution of machine-readable instructions. The machine-readable medium can include volatile and/or non-volatile memory such as a random access memory ("RAM"), magnetic memory such as a hard disk, floppy disk, and/or tape memory, a solid state drive ("SSD"), flash memory, phase change memory, and the like.

What is claimed is:

1. A computing device comprising:
   a processor to:
   receive a request for feedback specifying data integrity associated with a configuration item migrated from a first system to a second system, the configuration item being associated with a data source, the data integrity indicating quality and completeness of the configuration item;
   identify anomalies associated with the configuration item and unresolved conflicts between the configuration item and at least one other data source;
   generate a high availability and disaster recovery forecast associated with the configuration item;
   calculate the data integrity based on the anomalies, the unresolved conflicts, and the high availability and disaster recovery forecast;
   generate feedback specifying the calculated data integrity associated with the configuration item; and
   provide the feedback via an assessment tool.

2. The computing device of claim 1, wherein the processor is further to identify gaps in data of the configuration item.

3. The computing device of claim 2, wherein the processor is further to provide a form requesting additional information associated with the gaps.

4. The computing device of claim 2, wherein the processor is further to automatically fill in the gaps in the data.

5. The computing device of claim 1, wherein the processor is further to:
   receive the configuration item from the first system;
   create a data model of the configuration item;
   extract, transform, and load the configuration item to the second system; and
   import the configuration item to an internal data repository of the second system.

6. The computing device of claim 5, wherein the data model of the configuration item is used to identify the anomalies and the unresolved conflicts and to generate the high availability and disaster recovery forecast.

7. The computing device of claim 1, wherein generating the feedback comprises generating a percentage associated with data completeness of the configuration item.

8. The computing device of claim 7, wherein generating the feedback further comprises generating a percentage associated with data quality of the configuration item.

9. A method comprising:
receiving, by a computing device, a request for feedback specifying data integrity associated with a configuration item migrated from a first system to a second system, the configuration item being associated with a data source, the data integrity indicating quality and completeness of the configuration item;
calculating, by the computing device, the data integrity, wherein calculating the data integrity comprises:
determining, by the computing device, anomalies associated with the configuration item and unresolved conflicts between the configuration item and at least one other data source; and
creating, by the computing device, a high availability and disaster recovery forecast associated with the configuration item, the data integrity being based on the anomalies, the unresolved conflicts, and the high availability and disaster recovery forecast;
generating, by the computing device, feedback specifying the calculated data integrity associated with the configuration item; and
displaying, by the computing device, the feedback.

10. The method of claim 9, further comprising:
identifying, by the computing device, gaps in data of the configuration item.

11. The method of claim 10, further comprising:
providing, by the computing device, a form requesting additional information associated with the gaps.

12. The method of claim 10, further comprising:
automatically filling in the gaps in the data.

13. The method of claim 9, further comprising:
receiving, by the computing device, the configuration item from the first system;
creating, by the computing device, a data model of the configuration item;
extracting, transforming, and loading, by the computing device, the configuration item to the second system; and
importing, by the computing device, the configuration item to an internal data repository of the second system.

14. The method of claim 9, wherein generating the feedback comprises generating a percentage associated with data completeness of the configuration item.

15. The method of claim 14, wherein generating the feedback further comprises generating a percentage associated with data quality of the configuration item.

16. A non-transitory machine-readable storage medium storing instructions that, if executed by at least one processor of a computing device, cause the computing device to:
receive a request for feedback, specifying data integrity associated with a configuration item migrated from a first system to a second system, the configuration item being associated with a data source, the data integrity indicating quality and completeness of the configuration item;
determine anomalies associated with the configuration item and unresolved conflicts between the configuration item and at least one other data source;
create a high availability and disaster recovery forecast associated with the configuration item;
calculate the data integrity based on the anomalies, the unresolved conflicts, and the high availability and disaster recovery forecast;
generate feedback specifying the calculated data integrity associated with the configuration item; and
display the feedback specifying the data integrity.

17. The non-transitory machine-readable storage medium of claim 16, wherein the instructions further cause the computing device to identify gaps in data of the configuration item.

18. The non-transitory machine-readable storage medium of claim 17, wherein the instructions further cause the computing device to provide a form requesting additional information associated with the gaps.

19. The non-transitory machine-readable storage medium of claim 17, wherein the instructions further cause the computing device to automatically fill in the gaps in the data.

20. The non-transitory machine-readable storage medium of claim 16, wherein generating the feedback comprises generating a percentage associated with data completeness of the configuration item.

* * * * *